(12) United States Patent
Tanaka et al.

(10) Patent No.: US 7,837,327 B2
(45) Date of Patent: Nov. 23, 2010

(54) CONTACT LENS USER SUPPORT SYSTEM AND SUPPORT METHOD

(75) Inventors: Hidenari Tanaka, Nagoya (JP); Kazuhiko Nakada, Nishin (JP); Hiroaki Suzuki, Toki (JP); Sadanori Ohno, Kasugai (JP); Tetsuji Kawai, Kasugai (JP)

(73) Assignee: Menicon Co., Ltd., Nagoya (JP)

(*) Notice: Subject to any disclaimer, the term of this patent is extended or adjusted under 35 U.S.C. 154(b) by 1598 days.

(21) Appl. No.: 10/510,516

(22) PCT Filed: Apr. 10, 2003

(86) PCT No.: PCT/JP03/04565

§ 371 (c)(1),
(2), (4) Date: Mar. 9, 2005

(87) PCT Pub. No.: WO2003/087755

PCT Pub. Date: Oct. 23, 2005

(65) Prior Publication Data

US 2005/0160009 A1    Jul. 21, 2005

(30) Foreign Application Priority Data

Apr. 12, 2002    (JP) .............................. 2002-111214

(51) Int. Cl.
*A61B 3/10*    (2006.01)

(52) U.S. Cl. ........................................ 351/205; 705/1.1

(58) Field of Classification Search ................. 705/1.1, 705/26, 27; 351/205; 422/37
See application file for complete search history.

(56) References Cited

U.S. PATENT DOCUMENTS 5,213,760 A * 5/1993 Dziabo et al. ................ 422/37
7,374,285 B2 * 5/2008 Toshima et al. ............. 351/205

FOREIGN PATENT DOCUMENTS

| JP | A 6-195571 | 7/1994 |
| JP | A 7-190884 | 7/1995 |
| JP | A 11-232328 | 8/1999 |
| JP | A 11-242699 | 9/1999 |

* cited by examiner

*Primary Examiner*—Amee A Shah
(74) *Attorney, Agent, or Firm*—Oliff & Berridge, PLC

(57) ABSTRACT

It is an object to provide a novel system for supporting contact lens users, who has not been provided with an after-selling support sufficiently, which is able to provide an appropriate support to individual contact lens user so that he can use contact lenses with comfortable. In order to attain the object, an image signal of the user's currently used contact lenses (20) acquired by a user client apparatus (18) is transmitted via communication network means (38), to a server apparatus (12) of a supporting entity (10). The server apparatus (12) then obtains lens condition evaluation data, which are stored in memory means (14) and transmitted via the communication network means (38) to the user client apparatus (18) so that the user (16) can be provided with the lens condition evaluation data.

31 Claims, 3 Drawing Sheets

CONTACT LENS USER SUPPORT SYSTEM AND SUPPORT METHOD

TECHNICAL FIELD

The present invention relates to a contact lens user support system and support method by which users using contact lenses may be provided with support through a communications network, so as to afford users continued comfort of contact lenses wear.

BACKGROUND ART

To date, contact lenses (hereinafter includes both soft types and hard types) have been widely used for correcting refractive power of the human eye, but nevertheless there always exists the possibility of some defect occurring during the life of the lens. For example, a contact lens can become contaminated by proteins or lipids that become deposited on it, or experience morphological defects such as deformation or chipping, or become damaged through scratching or cracking. These instances are by no means rare.

Problems resulting from such defects are not limited to reduced wear comfort and impaired vision, but also pose the risk of severe problems such as damage to the user's cornea.

Defects occurring in contact lenses such as those mentioned above may not just be readily noticeable to the user. In the case of soft contact lenses in particular, deposited contaminants, or even morphological defects or scratches, may not be noticeable at all to the user or may not be recognized as a significant problem, in certain instances, so that the user continues to use the defective lens over an extended period.

To solve such problems, it would be possible, for example, to compel periodic examination of contact lenses by the user himself or by bringing the lenses to a dealer shop or the like, but such measures are not effective in practical terms. That is, in many instances, it is difficult to inspect contact lenses for the occurrence of defects like those mentioned above, and in particular since in most cases the user needs to always wear contact lenses, it is not practical to send the lenses in to a dealer shop for inspection. In addition to this, there has been no effective method by which contact lenses currently used by a user can be inspected for defects and the like.

Methods for assessing the extent of contamination of a contact lens by proteins or lipids are disclosed inter alia in JP-A-9-15155 and JP-A-11-94795. However, as each of these methods involves detecting total quantity of proteins or lipids separated and extracted from a lens, the detection operation involves the use of special extraction solutions and the like, making it difficult and time-consuming, as well as being unable to discern the extent of localized contaminant deposits or the condition of distribution of deposits on a contact lens, so that such methods are not easy utilized by the user.

Another method that has been considered involves soaking the lens in a staining reagent that selectively stains a particular type of contaminants, and observing the stained areas on the lens and the shade thereof. However, as this method involves the use of a special reagent or the like, the detection procedure remains very complicated and requires specialized knowledge for proper observation of the results, making this method impractical as well.

For protein deposits and the like, in most cases routine care (e.g. periodic removal of deposits or the like) and lens replacement are required, but such measures are necessarily effective only for certain specific types of contaminants. Additionally, with regard to protein deposits and the like, the extent of contamination of a contact lens will vary appreciably not only due to differences in the makeup of lachrymal fluid among different users, but also depending on the number of hours the lens is worn in a day, the user's surroundings, and various other conditions, so that such measures will not necessarily be effective for all users.

With the foregoing in view the invention has been developed, it is an object of the present invention to provide a novel support method and support system for contact lens users whereby, for contact lenses that to date care of which has been left up to the user exclusively with virtually no appropriate support being provided after the sale, users may now be provided on an individual basis with appropriate support, and afforded comfortable contact lens wear thereby.

It is a further object of the invention to provide a novel support method and support system for contact lens users whereby through appropriate support after sale of contact lenses, defects such as contamination of or damage to contact lenses may be readily checked by the user himself.

DISCLOSURE OF THE INVENTION

There will be described modes of the invention created for the purpose of addressing the above problems. Elements employed in each mode described herein may be employed in any possible combination. It is to be understood that the modes and technical features of the invention are not limited to those disclosed herein, but may otherwise be recognized based on the teachings of the present invention disclosed in the entire specification and drawings or that may be recognized based on concept of the invention recognized by those skilled in the art in the light of the present disclosure.

(First Mode of Invention Relating to Support System)

The invention in a first mode thereof relating to a contact lens user support system comprising: (a) a multiplicity of user client apparatuses for use by a multiplicity of users who use contact lenses, each apparatus including image signal acquiring means for acquiring an image signal of a contact lens used by each user; (b) a server apparatus for use by a supporting entity, the apparatus including evaluation data calculating means for deriving lens condition evaluation data for evaluating the condition of the contact lens on the basis of the contact lens image signal; (c) memory means for storing information able to be read out by the server apparatus; and (d) communication network means enabling sending and receiving of signals between the user client apparatuses and the server apparatus, the contact lens user support system wherein the image signal acquired by the image signal acquiring means of the user client apparatus with the contact lens used by the user as the subject is transmitted via the communication network means to the server apparatus; the lens condition evaluation data for the contact lens is derived by the evaluation data calculating means of the server apparatus, the lens condition evaluation data being associated with identifying information of the user and stored in the memory means; and the lens condition evaluation data is transmitted via the communication network means to the user client apparatus so as to be provided to the user.

In the support system constructed in accordance with this mode, a first significant feature thereof focuses on the fact that most defects occurring during contact lens use, are ones that can be ascertained through inspection of the contact lens from the outside, such as contamination, deformation, or damage, and a second significant feature thereof lies in skillful utilization of communication network means which have seen marked development and increasingly widespread use in recent years, and which are readily accessible to most users.

Thus, there is now realized a completely novel system whereby a contact lens user can readily conduct an inspection at time objectively determined necessary by himself.

Specifically, in the support system, a contact lens user, at a time and location appropriate to his or her living environment (e.g. from home), simply needs to scan in an image signal of the contact lenses currently used by the user, and transmit this image signal from the user's client apparatus to the server apparatus via communications network means. The server apparatus receiving the image signal will then analyze the image signal to acquire lens condition evaluation data, which lens condition evaluation data is sent back to the user client apparatus so that the user may be apprised, by means of the client apparatus on hand, of the results of evaluation of the contact lenses currently used by the user.

Accordingly, through the use of such a support system, a contact lens user may readily ascertain the condition (e.g. contamination etc.) of his contact lenses without the need for evaluation data calculating means that includes advanced or specialized analysis software or the like for deriving lens condition evaluation data from image signals, thereby enabling the user to use contact lenses comfortably by taking appropriate measures on the basis of the evaluation data obtained thereby.

Meanwhile the supporting entity is able to carry out ongoing user support of contact lenses after these have been supplied to the user, as well as to store in memory means information such as image signals of contact lenses supplied by users, so that data of various kinds under conditions of contact lens use can be effectively obtained thereby, and this data used for contact lens development, marketing, and so on.

In this mode, an electronic device such as a cell phone or PC equipped with outside communication functionality can be used appropriately as a user client apparatus, the apparatus being provided by the user himself, or loaned or transferred to the user by the contact lens supporting entity or dealer shop. The image signal acquiring means may be composed of a CCD camera or other device capable of acquiring a view of a contact lens in the form of an electrical image signal. In preferred practice, it will be integrally connected to the user client apparatus or incorporated therewith. The communication network means may be one able to transmit signals through a wired or wireless system, for example, one using telephone or other existing lines, or a wireless network. Likewise, the server apparatus can be realized using a PC or the like, in which case, for example, the evaluation data calculating means may be realized be installing appropriate calculation software on the PC serving as the server apparatus. The memory means may be composed of information administered as files accessible directly from an application on the server apparatus, or a database in the narrow sense, constituted independently from applications on the server apparatus, and used by the server apparatus via a database management system (DBMS) or the like. User identifying information can consist of any information able to individually identify all users. For instance, name and address, ID numbers, or the like could appropriately be used as identifying information.

(Second Mode of Invention Relating to Support System)

The invention in a second mode thereof provides a contact lens user support system according to the first mode hereinabove, wherein the image signal includes a motion video image signal. By evaluating the condition of a contact lens as the subject of a motion video image signal, it is possible to acquire for evaluation information that is difficult to acquire when a lens is the subject of a still image only, thereby enabling a higher level of support to be provided. Specifically, for example, when evaluating contamination the subject could be an image signal derived by capturing on video a coloring reaction or other such change over time, or during blinking with the contact lens in the eye, one derived by capturing on video movement or stability of the contact lens on the eyeball. In this mode, an image signal may consist of motion video only, or of both motion video and a still image. Motion video may be transmitted in real time, transmitting the image captured by a suitable image capture element via communication network means, or previously acquired motion video may be transmitted. During video transmission, a known data compression scheme may be employed if necessary.

(Third Mode of Invention Relating to Support System)

The invention in a third mode thereof provides a contact lens user support system according to the first or second mode hereinabove, wherein the lens condition evaluation data derived by the evaluation data calculating means of the server apparatus includes at least one set of data relating to the contact lens used by the user and selected from evaluation data relating to contaminants such as protein deposits or lipid deposits; evaluation data relating to morphology such as deformation or chipping; and evaluation data relating to damage such as scratches or cracks. Specifically, ① evaluation data relating to contamination, ② evaluation data relating to morphology, and ③ evaluation data relating to damage can each be readily acquired on the basis of an image signal of a contact lens transmitted from a user client apparatus to the server apparatus, providing data suitable for evaluating the condition of a contact lens, and making it possible to effectively evaluate the condition of a contact lens. In the event that the aforementioned ② evaluation data relating to morphology is employed, it is preferable to incorporate into the image data for the contact lens an index serving as a measure of the dimensions thereof, for example, by providing a measuring scale on the support stage on which the contact lens is placed, or on the optical path over which the image is scanned in.

(Fourth Mode of Invention Relating to Support System)

The invention in a fourth mode thereof provides a contact lens user support system according to any one of the first to third modes hereinabove, wherein the image signal acquiring means of the user client apparatus includes (e) irradiating means for irradiating the contact lens used by the user with excitation light able to excite a predetermined target substance to produce fluorescence; and (f) detecting means for detecting a lens fluorescent image formed by fluorescence produced principally by the predetermined target substance in the contact lens when illuminated with excitation light by the irradiating means. In this mode, it is possible to derive a lens fluorescent image corresponding to protein or lipid deposits, to morphological defects such as deformation or chipping, or to damage such as scratches cracks in a contact lens, without subjecting the contact lens per se to any physical or chemical adverse effects, and to transmit the lens fluorescent image as an image signal to the server apparatus, whereby it is possible on the server apparatus end to advantageously detect deposited contaminants on the contact lens, without having to directly handle the contact lens. Additionally, by using such a lens fluorescent image created by excitation light to derive an image signal, it becomes possible to detect and convert into an image signal deposited protein or lipid contaminants, without the use of conventional staining reagents or the like that can have residual effects on contact (Fifth Mode of Invention Relating to Support System)

The invention in a fifth mode thereof provides a contact lens user support system according to the fourth mode hereinabove, wherein the detecting means in the user client apparatus is composed of imaging means able to image the contact lens illuminated with excitation light by the irradiating means, and to detect it as an image signal in which levels of fluorescent intensity corresponding to the condition of the target substance are associated with locations on the contact lens. In this mode, locations of deposited contaminants, morphological defects, or damage on a contact lens can be identified, enabling a higher level of accuracy in evaluation.

(Sixth Mode of Invention Relating to Support System)

The invention in a sixth mode thereof provides a contact lens user support system according to the fifth mode hereinabove, wherein the evaluation data calculating means in the server apparatus is constituted to include cumulating means for cumulating fluorescent intensity in pixel units derived on the basis of the image signal of the contact lens acquired by the imaging means of the user client apparatus. In this mode, it is possible to derive evaluation data that can be used to readily ascertain the overall extent of deposited contaminants, defects in morphology (size), damage or the like of a contact lens.

(Seventh Mode of Invention Relating to Support System)

The invention in a seventh mode thereof provides a contact lens user support system according to the sixth mode hereinabove, wherein the predetermined substance excited by means of the excitation light is a contaminant deposit such as a protein or lipid deposited on the contact lens; and in that the server apparatus is constituted to include (g) calibration curve creating means for creating a calibration curve indicating a relationship between a product of fluorescent intensity of a standard solution of known concentration having dissolved therein a component of interest in the contaminant deposit on the contact lens and the detected area thereof, to a dissolved amount of component of interest of the contaminant deposit in the standard solution; and (h) quantifying means for comparing a cumulative value derived by the cumulating means with a calibration curve derived by the calibration curve creating means to carry out quantification of the contaminant deposit on the contact lens. In this mode, the overall extent of deposited contaminants on a contact lens can be ascertained as more specific, absolute data.

(Eighth Mode of Invention Relating to Support System)

The invention in an eighth mode thereof provides a contact lens user support system according to any one of the fifth to seventh modes hereinabove, wherein the evaluation data calculating means in the server apparatus, on the basis of the image signal of the contact lens acquired by the imaging means of the user client apparatus, analyzes the fluorescence of the contact lens into multi-tone color to derive the lens condition evaluation data; and in that the user client apparatus is provided with monitor means for displaying the fluorescence of the contact lens in multi-tone color, on the basis of the lens condition evaluation data transmitted thereto through the communication network means. In this mode, the extent of deposited contaminants, damage, or the like can be displayed to the contact lens user in a visually easy-to-understand manner, so that the user can more readily ascertain the extent of contamination or damage.

(Ninth Mode of Invention Relating to Support System)

The invention in a ninth mode thereof provides a contact lens user support system according to any of the first to eighth modes hereinabove, further comprising reference signal memory means adapted to store therein data of a multiplicity of reference image signals acquired in advance for unused contact lenses respectively having same specifications as various types of the contact lenses used by the multiplicity of the users, wherein the evaluation data calculating means of the server apparatus processes by calculation the image signal of the contact lens used by the user while referencing to the reference image signal provided by the reference signal memory means in order to obtain the lens condition evaluation data for the lens. In this mode, image signals (reference image signals) for contact lenses that have not yet experienced deposits of contaminants or other defects (reference lenses) are derived in advance, and by comparing these with image data for contact lens currently used by users, it is possible to eliminate any signal on image data that is due to a defect present in the contact lens as-manufactured, rather than to some subsequently occurring defect such as contamination or damage, and to thereby obtain with a greater degree of accuracy evaluation data relating to targeted defects such as contamination or damage.

In this mode, preferably, a reference image signal for an unused contact lens will be acquired under generally identical conditions as the image signal for the contact lens currently used, the signal having been acquired by the user and transmitted to the server apparatus. Additionally, in this mode, when making reference to the reference image signal, by subtracting the reference image signal from the image signal of the currently used contact lens acquired by the user and transmitted to the server apparatus, there is derived evaluation data for contaminant deposits or other defects, which data has been derived on the basis of image signal data from which the data of the reference image signal has been eliminated.

(Tenth Mode of Invention Relating to Support System)

The invention in a tenth mode thereof provides a contact lens user support system according to the ninth mode hereinabove, wherein for the various types of the contact lenses used by the multiplicity of the users, reference is made to reference image signals for corresponding unused contact lenses having identical specifications therewith, which reference includes a lot number. In this mode, since it is possible with an even higher level of accuracy to eliminate signals on image data due to defects present in the contact lens as-manufactured rather than to subsequently occurring defects, evaluation data relating to targeted defects such as contamination can be obtained with an even higher level of accuracy. In this mode, preferably, the lot number will be an identifying symbol assigned to each of a specific quantity of contact lenses manufactured under conditions considered to be equivalent, and lenses will be managed on the basis of production lot number.

(Eleventh Mode of Invention Relating to Support System)

The invention in an eleventh mode thereof provides a contact lens user support system according to any one of the first to tenth modes hereinabove, further comprising membership cost management means adapted to store therein membership cost payment information made by the users to the supporting entity, wherein the server apparatus verifies membership cost payment status of the user on the basis of the membership cost payment information stored in the membership cost management means, and the lens condition evaluation data is transmitted to the user client apparatus on the condition of the user having paid the membership cost to the supporting entity. In this mode, by assessing users a membership fee in order to be provided with support, there is provided the advantage of being able to realize a high level of support, for example.

(Twelfth Mode of Invention Relating to Support System)

The invention in a twelfth mode thereof provides a contact lens user support system according to any one of the first to eleventh modes hereinabove, further comprising in the server apparatus is image signal requesting means that, once the server apparatus has received the image signal from the user client apparatus via the communication network means, counts for a predetermined set time period, and when the set time period has elapsed request the user client apparatus via the communication network means to transmit a new the image signal. In this mode, the user may be reminded in the event that, for example, he has forgotten to inspect his contact lenses, so that he can be continuously and effectively provided support. In preferred practice, the period for which a user receives support such as inspection for contamination or other defects in an image signal transmitted by him will be settable arbitrarily with reference to considerations such as the extent of contamination (e.g. pattern of progression or frequency of occurrence) of a contact lens depending on the particular type of contact lens used by the user, or differences in durability. It is effective to appropriately adjust the setting for the set time period until the next image signal transmission request with reference to the results of lens condition evaluation data for several preceding times, for example.

(Thirteenth Mode of Invention Relating to Support System)

The invention in a thirteenth mode thereof provides a contact lens user support system according to any one of the first to twelfth modes hereinabove, further comprising a lens provider client apparatus for use by a lens providing entity that manufactures the contact lenses, wherein sending and receiving of signals between the lens provider client apparatus and the server apparatus is possible by means of the communication network means, and wherein the lens condition evaluation data is transmitted from the server apparatus to the lens provider client apparatus, and basic data provided for contact lenses manufactured by the lens providing entity is transmitted from the lens provider client apparatus to the server apparatus. In this mode, basic data for contact lenses proprietary to a lens providing entity can be utilized in order to further simplify acquisition of lens condition evaluation data and to give a higher level of accuracy. Additionally, the lens providing entity can utilize image signals of currently used contact lenses obtained from the users, which may prove useful in subsequent development and design of contact lenses. In the event that some sort of production defect is discovered in image signals of contact lenses obtained from users, rapid countermeasures such as recall of products having corresponding specifications or coming from the corresponding production lot can be taken, thereby effectively avoiding greater problems.

(Fourteenth Mode of Invention Relating to Support System)

The invention in a fourteenth mode thereof provides a contact lens user support system according to thirteenth modes hereinabove, wherein the lens provider client apparatus comprises reference image signal acquiring means for acquiring the reference image signals in the eighth mode of the invention, the reference image signals being transmitted to the server apparatus by way of at least one item of the basic data. In this mode, since reference image signals are acquired by the lens providing entity, it is a simple matter to acquire, store, and manage reference image signals for a large number of contact lens types. It is accordingly possible, for example, to acquire reference image signals on an individual production lot basis and associate production lot numbers with contact lenses currently used by users, so that any defects can be identified with greater accuracy.

(Fifteenth Mode of Invention Relating to Support System)

The invention in a fifteenth mode thereof provides a contact lens user support system according to any of the first to fourteenth modes hereinabove, further comprising: a lens dealer shop client apparatus for use by a lens dealer shop that sells the contact lenses directly to the users, wherein sending and receiving of signals between the lens dealer shop client apparatus and the server apparatus is possible by means of the communication network means, and the lens condition evaluation data is transmittable from the server apparatus to the lens dealer shop client apparatus; and comprising visit instructing means that refers to the lens condition evaluation data, and if necessary transmits from the server apparatus to the user client apparatus a dealer shop visit instruction signal that instructs the user to visit the lens dealer shop. In this mode, by transmitting the condition of a user's contact lenses to the dealer shop that will be visited by the user, it becomes possible for user to receive faster appropriate care at the dealer shop.

(Sixteenth Mode of Invention Relating to Support System)

The invention in a sixteenth mode thereof provides a contact lens user support system according to the fifteenth mode hereinabove, wherein examination information relating to results of examination of the user who has visited the lens dealer shop is transmitted from the lens dealer shop client apparatus to the server apparatus, the information being associated with identifying information for the user and stored in the memory means. In this mode, data that is difficult to ascertain simply from an image signal transmitted from the user's client apparatus but that can be acquired directly through contact with the user at a dealer shop, for example, data pertaining to the user's condition, medical condition, exam results, and the like, can be transmitted to the server apparatus where it can be utilized. Thus, it becomes possible to improve the quality of support to users, for example, by means of associating contamination or other defect identified from an image signal transmitted from a user's client apparatus with the condition of the user acquired through an exam conducted at a dealer shop, and looking for any correlation between the two.

(Seventeenth Mode of Invention Relating to Support System)

The invention in a seventeenth mode thereof provides a contact lens user support system according to any of the first to sixteenth modes hereinabove, further comprising lens characteristic memory means for storing characteristic data for each type of the contact lens used by the users and/or care product characteristic memory means for storing characteristic data for care products of various types used with contact lenses used by the users, wherein in the server apparatus, information relating to protein deposits, lipid contaminants, or other contamination of the contact lens used by the user is acquired on the basis of the image signal acquired from the user client apparatus, and in the evaluation data calculating means, characteristic data stored in the lens characteristic memory means and/or care product characteristic memory means is utilized to derive from the information relating to recommended measures to be taken in regard to contamination of the contact lens, the information relating to recommended measures being included in the lens condition evaluation data, and the lens condition evaluation data being transmitted to the user client apparatus.

In this mode, it is possible to provide a higher level of support by taking into consideration individual conditions of contact lens users. Specifically, contact lenses are fabricated from various kinds of materials in consideration of differences in lens wear schedule or lens life, specifics of refractive power correction, the constitution of the individual wearer, and other such conditions. In each case, while there are some differences, contaminant deposits by proteins or lipids tend to be a problem. Proteins or lipids are present in lachrymal fluid, and in the course of contact lens wear become deposited on contact lenses, and are not always easily removed, so that it is sometimes difficult to remove contaminants to an adequate extent by means of normal care alone. Depending on variations in the makeup of lachrymal fluid among individuals, such deposits tend to pose a very large problem. There is also a high likelihood of deposition and accumulation of contaminants components on contact lenses will eventually lead to impaired wear comfort, diminished oxygen permeability, shortened lens life, impaired vision, damage to the cornea, or various other such problems. In actual practice, once a certain period of time has elapsed since the user actually puts in contact lenses until sufficient subjective symptoms, e.g., lens fogging, red eyes, or significant discomfort appear, such deposits are not noticed and are left untreated. That is, due to the lack of a system for efficiently providing support such as early decision with regard to the compatibility of contact lenses being used or the compatibility of lens care products being used by users, there was a risk that problems such as those mentioned above could increase due to continued use of contact lenses or lens care products that were not sufficiently compatible. While the occurrence of such problems can be avoided by having the user undergo periodic examination or the like, since such examinations represent a considerable expenditure of time, it is not practical to expect users to do so. Particularly as contact lenses are now popularized and readily available for sale, they are treated just like any other mass consumption good, and there is an urgent need for some remedy.

Accordingly, in the support system according to this mode, a contact lens image signal sent from a user to the server apparatus via communication network means is utilized for the purpose of acquiring information relating to protein deposits, lipid contamination, or other contamination of a contact lens, and on the basis of this information relating to contamination it is possible, for example, to decide upon the suitability of a currently used contact lens or lens care product to the user thereof. Thus, by sending back to the user from the server apparatus via the communication network means information relating to appropriate recommended measures, such as this kind of suitability information, the user can be readily provided with a high level of individualized support as relates to contact lens use, without the burden of having to undergo a time-consuming examination by an ophthalmologist or the like.

In this mode, characteristic data for contact lenses and lens care products may consist of any kind of data helpful in terms of contact lens support, and is not limited to any particular kind. Specifically, characteristic data relating to contact lenses could include, for example, contact lens material, lens life, tendency to become contaminated with proteins or lipids, compatibility with lens care products, and various other kinds of data; characteristic data relating to lens care products could include, for example, ability to individually dissolve and remove proteins and lipids, chemical effects on specific contact lenses, conditions for use, and various other kinds of data. Lens care products to which this mode is directed include contact lens cleaning solutions, disinfecting solutions, storage solutions, and other such daily use treatment solutions, as well as chemical solutions used only where a specific purpose so requires, as well as treatment apparatuses such as heaters and the like. Also considered as lens care products in this mode are care system products consisting of a set that includes a cleaning solution, disinfecting solution, storage solution, and the like, and products consisting of a single all-in-one treatment solution having cleaning, disinfecting, and storing functions.

In this mode, as the lens characteristic memory means or care product memory means there could be employed any of various kinds of storage device able to store characteristic data for contact lenses of the kind described above or characteristic data for lens care products, as information that can be read by the server apparatus. For instance, an arrangement utilizing memory means for storing lens condition evaluation data would be possible. In this mode, as will be described later, recommended measures may be arrived at, for example, from information relating to individual compatibility with the user of contact lenses or lens care product currently used by the user, as will be described later, or where such compatibility is low, from advice information prompting the user to change contact lenses and/or lens care product, or from information specifically indicating a more compatible contact lens or lens care product. Alternatively, information specifically indicating care measures to be performed on the contact lens at the current point in time, for example, a protein removal process, hot water boiling process or the like, would be acceptable as well.

In most cases, the method for arriving at such recommended measures will be based on characteristic data, arrived at through testing in advance, for each type of contact lens and each type of lens care product with reference to the type and extent of contamination as determined from the image data. In the event that protein deposits are considerable, it may take the form of advice to switch to contact lens of material more resistant to protein deposits or to a lens care product more effective in removing proteins. Similarly in the event that lipid deposits are considerable, it may take the form of advice to switch to contact lens of material more resistant to lipid deposits or to a lens care product more effective in removing lipids. More specifically, with regard to proteins, lipids, and other contaminants that easily tend to become a problem, such measures can be realized readily by pre-establishing specific threshold values therefore using as indices numerical data derived from image signals provided by users to classify the extent of contamination into levels such as "good", "acceptable", and "alert" and then assigning contamination values derived from image signal provided by a user to any of these levels, it becomes possible to decide upon advice (recommended measures) to be provided to the user. Decisions based on the value of contamination information can be made, for example, by creating in advance, on the basis of numerous experiments or logical values, a data table that determines compatibility with each contact lens and lens care product, and making decisions using this data table, whereby decisions, i.e. recommended measures, can be advantageously effected by a server apparatus or other computer apparatus.

Information relating to recommended measures for a user, arrived at in this manner, can be provided as lens condition evaluation data or appended thereto, and thereby in either case included in lens condition evaluation data, whereby it can be transmitted to the user client apparatus used by the user in question.

(Eighteenth Mode of Invention Relating to Support System)

The invention in an eighteenth mode thereof provides a contact lens user support system according to the seventeenth mode hereinabove, further comprising lachrymal fluid data memory means for storing lachrymal fluid data relating to the properties of the lachrymal fluid of the user, wherein in the evaluation data calculating means, recommended measures in relation to the contact lens are derived from information relating to the contamination utilizing characteristic data stored in the lens characteristic memory means and/or the care product characteristic memory means, while making reference to individual the lachrymal fluid data for the user stored in the lachrymal fluid data memory means.

In this mode, information relating to contamination of a contact lens derived on the basis of an image signal provided by a user in the manner described previously is additionally supplemented by information derived from lachrymal fluid data, whereby the degree of accuracy in determining recommended measures in relation to contact lenses may be improved. Specifically, it is known that properties of lachrymal fluid (e.g. composition ratios) differ by individual user, and that individual differences in lachrymal fluid are correlated to the extent of contamination of contact lenses when contact lenses are worn. Accordingly, by taking into consideration data that relates to the properties of lachrymal fluid of the user who is wearing contact lenses, in the event that, for example, the proportion of protein in the lachrymal fluid is significantly greater than average, in the event that information relating to contamination derived on the basis of image information indicates that the amount of deposited protein is considerable, it is possible to verify the validity of this finding, and to make more accurate decisions.

In this mode, acquisition of lachrymal fluid data may be accomplished, for example, by carrying out a test on each user with litmus paper, testing solution, or the like, and transmitting this from the user client apparatus using the communication network means. However, in preferred practice, the user will be prompted to visit a lens dealer shop (including ophthalmologists) so that lachrymal fluid data can be acquired by a specialist using specialized equipment, which is more desirable in terms of data accuracy and equipment considerations. It follows that this mode is preferably employed in combination with the fifteenth or sixteenth mode herein, using the lens dealer client apparatus to transmit the lachrymal fluid data to the server apparatus via the communication network means.

(Nineteenth Mode of Invention Relating to Support System)

The invention in a nineteenth mode thereof provides a contact lens user support system according to any of the first to eighteenth modes herein, wherein in the server apparatus information relating to protein deposits, lipid contaminants, or other contamination of the contact lens used by the user is acquired on the basis of the image signal acquired from the user client apparatus, lens characteristic memory means are provided for storing characteristic data regarding various kinds of the contact lenses used by the users, while the evaluation data calculating means, contact lens characteristic data stored in the lens characteristic memory means is utilized in deriving evaluation data of compatibility of the contact lens of the user from the information relating to contamination, with the resultant lens compatibility evaluation data being included in the lens condition evaluation data as information relating to the recommended measures, and the lens condition evaluation data transmitted to the user client apparatus.

In this mode, characteristic data for various contact lenses is stored in lens characteristic memory means so as to enable utilization thereof, whereby even where numerous types of contact lenses exist, characteristic data for contact lenses for a particular targeted user can be acquired and utilized quickly and easily, making it possible to quickly and easily derive contact lens compatibility evaluation data for the user.

(Twentieth Mode of Invention Relating to Support System)

The invention in a twentieth mode thereof provides a contact lens user support system according to any one of the first to nineteenth modes hereinabove, wherein in the server apparatus information relating to protein deposits, lipid contaminants, or other contamination of the contact lens used by the user is acquired on the basis of the image signal acquired from the user client apparatus, while care product characteristic memory means are provided for storing characteristic data regarding various kinds of lens care products for use with the contact lenses used by the users, and wherein in the evaluation data calculating means, lens care product characteristic data stored in the care product characteristic memory means is utilized in deriving evaluation data of compatibility of the lens care product of the user from the information relating to contamination, with the resultant compatibility care product evaluation data being included in the lens condition evaluation data as information relating to the recommended measures, and the lens condition evaluation data transmitted to the user client apparatus.

In this mode, characteristic data for various kinds of care products is stored in care product characteristic memory means so as to enable utilization thereof, whereby even where numerous types of lens care products exist, characteristic data for a lens care product for a particular targeted user can be acquired and utilized quickly and easily, making it possible to quickly and easily derive lens care product compatibility evaluation data for the user.

(Twenty-first Mode of Invention Relating to Support System)

The invention in a twenty-first mode thereof provides a contact lens user support system pertaining to the nineteenth or twentieth mode hereinabove, wherein at a point in time coming at the end of a predetermined trial period commencing with initial use of new contact lenses by the user, and/or in the event that use of contact lenses by the user is ongoing a point in time coming after a predetermined time interval has elapsed, evaluation data of compatibility of the contact lenses or the lens care product is derived.

In this mode, it is possible to evaluation compatibility of contact lenses for a user faster and with a higher level of efficiency, whereby occurrence of problems resulting from the use of contact lenses with poor compatibility may be avoided before they occur or while still in the initial stage.

(First Mode of Invention Relating to Support Method)

The invention in a first mode thereof relating to a contact lens user support method is characterized in that an image signal of a contact lens acquired by a user of the contact lens himself is transmitted through communication network means from a user client apparatus provided for use by the user to a server apparatus provided for use by a supporting entity; at the supporting entity, lens condition evaluation data for evaluating a condition of the contact lens is derived on the basis of the contact lens image signal; the lens condition evaluation data is associated with individual information for the user and stored in memory means utilizable by the server apparatus; and the lens condition evaluation data is provided to the user by being transmitted to the user client apparatus through the communication network means.

According to the method of the invention, through skillful utilization of communication network means which have seen marked development in recent years, by having the user himself acquire an image signal of a contact lens and transmit it for analysis to a server apparatus that performs overall administration, it is possible to evaluate the condition of the contact lens and to provided the user with the results of the evaluation. It is accordingly possible for a user to inspect a contact lens that he is currently using for defects with a high degree of accuracy in an exceedingly easy way simply by temporarily removing the contact lens, and without the need to go to any particular place, the need for long term obligation, or the need to leave the contact lenses with someone. Thus, post-sale user support for contact lenses individualized for each user can be realized advantageously without imposing an excessive burden on the user.

(Second Mode of Invention Relating to Support Method)

A second mode of the method of the invention provides a contact lens user support method according to the first mode of the method of the invention, wherein the contact lens image signal includes a motion video image signal. By evaluating the condition of a contact lens as the subject of a motion video image signal, it is possible to acquire for evaluation information that is difficult to acquire when a lens is the subject of a still image only, thereby enabling a higher level of support to be provided.

(Third Mode of Invention Relating to Support Method)

A third mode of the method of the invention provides a contact lens user support method according to the first or second mode of the method of the invention, wherein the lens condition evaluation data provided to the user by being transmitted from the server apparatus to the user client apparatus includes evaluation data relating to protein deposits, lipid deposits, or other such contaminants, and/or evaluation data relating to morphology such as deformation or chipping, and/or evaluation data relating to damage such as scratches or cracks in the contact lenses used by the user; and wherein information relating to the need to replace the contact lenses and information relating to a lens dealer shop serving as provider for the contact lens replacement, user examination and the like are provided to the use together with the lens condition evaluation data, by being sent to the user client apparatus.

(Fourth Mode of Invention Relating to Support Method)

The fourth mode of the method of the invention provides a contact lens user support method according to any one of the first to third modes of the method of the invention, wherein when the contact lens image signal is transmitted from the user client apparatus to the server apparatus, reference information relating to lens wear conditions by the user and the like is included in the transmission. In this mode, it is possible for the server apparatus to acquire reference information, for example, impressions during lens wear, awareness of a defect, wear schedule, living environment, and the like, whereby this reference information can be used skillfully to improve the quality of user support.

(Fifth Mode of Invention Relating to Support Method)

A fifth mode of the method of the invention provides a contact lens user support method pertaining to any of the first to fourth modes of the method of the invention, wherein multiple items of advice information relating to contact lens handling and wear are prepared in advance, and one of the items is selected with reference to the lens condition evaluation data provided to the user and provided to the user together with the lens condition evaluation data. In this mode, a user may be provided with somewhat individualized advice, for example, an instruction to more frequently perform care to remove protein deposits, on a labor-saving, automated basis through skillful utilization of lens condition evaluation data.

(Sixth Mode of Invention Relating to Support Method)

A sixth mode of the method of the invention provides a contact lens user support method according to any one of the first to fifth modes of the method of the invention, wherein examination information relating to examination results for a user acquired at a lens dealer shop directly selling the contact lenses to the user is transmitted from a lens dealer shop client apparatus used by the lens dealer shop to the server apparatus, and is associated with individual information for the user and stored in the memory means utilizable by the server apparatus. According to the method of this mode, information that is difficult to acquire simply from an image signal transmitted from a user can be acquired by the server entity from result data for an examination or the like conducted at a lens dealer shop. The information is stored in association with information for individual users, enabling the server entity to acquire and administer information containing a higher level of detail in relation to each user, and to utilize this information when needed.

(Seventh Mode of Invention Relating to Support Method)

A seventh mode of the method of the invention provides a contact lens user support method according to any of the first to sixth modes of the method of the invention, wherein information stored in association with individual information for the use in the memory means is utilizable from outside the server apparatus through the communication network means, on the condition of verification of a match with pre-registered identifying information or the like. In this mode, it is possible for a user, dealer shop, or ophthalmologist, for example, to effectively utilize required data that is stored on the server apparatus and administered by the supporting entity, while under the required administration as regards user personal information.

(Eighth Mode of Invention Relating to Support Method)

A eighth mode of the method of the invention provides a contact lens user support method according to any one of the first to seventh modes of the method of the invention, wherein in the supporting entity, information relating to protein deposits, lipid contaminants, or other contamination of the contact lens used by the user is acquired on the basis of an image signal of the contact lens; utilizing lens characteristic data for various types of contact lenses and/or care product characteristic data relating to lens care products of various types for use with the contact lenses, recommended measures to be taken with regard to the contact lens are derived from information relating to contamination of the contact lens; and information relating to the recommended measures is included in the lens condition evaluation data and provided to the user. In accordance with the support method of this mode, as described in detail previously in the sixteenth mode of the invention relating to a support system, it is possible to efficiently provide a high level of support to individual users of contact lenses, and in particular through consideration of individual differences among users, to reduce the incidence of problems resulting from the use of contact lenses or lens care products with poor compatibility.

(Ninth Mode of Invention Relating to Support Method)

A ninth mode of the method of the invention provides a contact lens user support method according to the eighth mode of the method of the invention, wherein information relating to the properties of the lachrymal fluid of a user is acquired, and while making reference to the lachrymal fluid data, the lens characteristic data and/or the care product characteristic data is utilized to derive from the information relating to contamination recommended measures to be taken with regard to the contact lens. In accordance with the support method of this mode, as described previously in the seventeenth mode of the invention relating to a support system, it is possible by means of taking into consideration compositional proportions in lachrymal fluid, which differ by user and which are highly correlated with contamination of contact lenses, to provide a higher level of accuracy in support of the users.

(Tenth Mode of Invention Relating to Support Method)

A tenth mode of the method of the invention provides a contact lens user support method according to the eighth or ninth mode of the method of the invention, wherein at a point in time coming at the end of a predetermined trial period commencing with initial use of new contact lenses by the user, and/or in the event that use of contact lenses by the user is ongoing a point in time coming after a predetermined time interval has elapsed, the recommended measures to be taken with regard to the contact lens are derived. In accordance with the support method of this mode, as described previously in the twentieth mode of the invention relating to a support system, it is possible to determine more efficiently the compatibility of a contact lens or care product for a user, and to effectively prevent occurrence of problems resulting from the user of an incompatible contact lens or the like by the user.

BEST MODE FOR CARRYING OUT THE INVENTION

In order to illustrate the invention more concretely, the embodiments of the invention are described in detail hereinbelow, making reference to the accompanying drawings.

Figure 1:
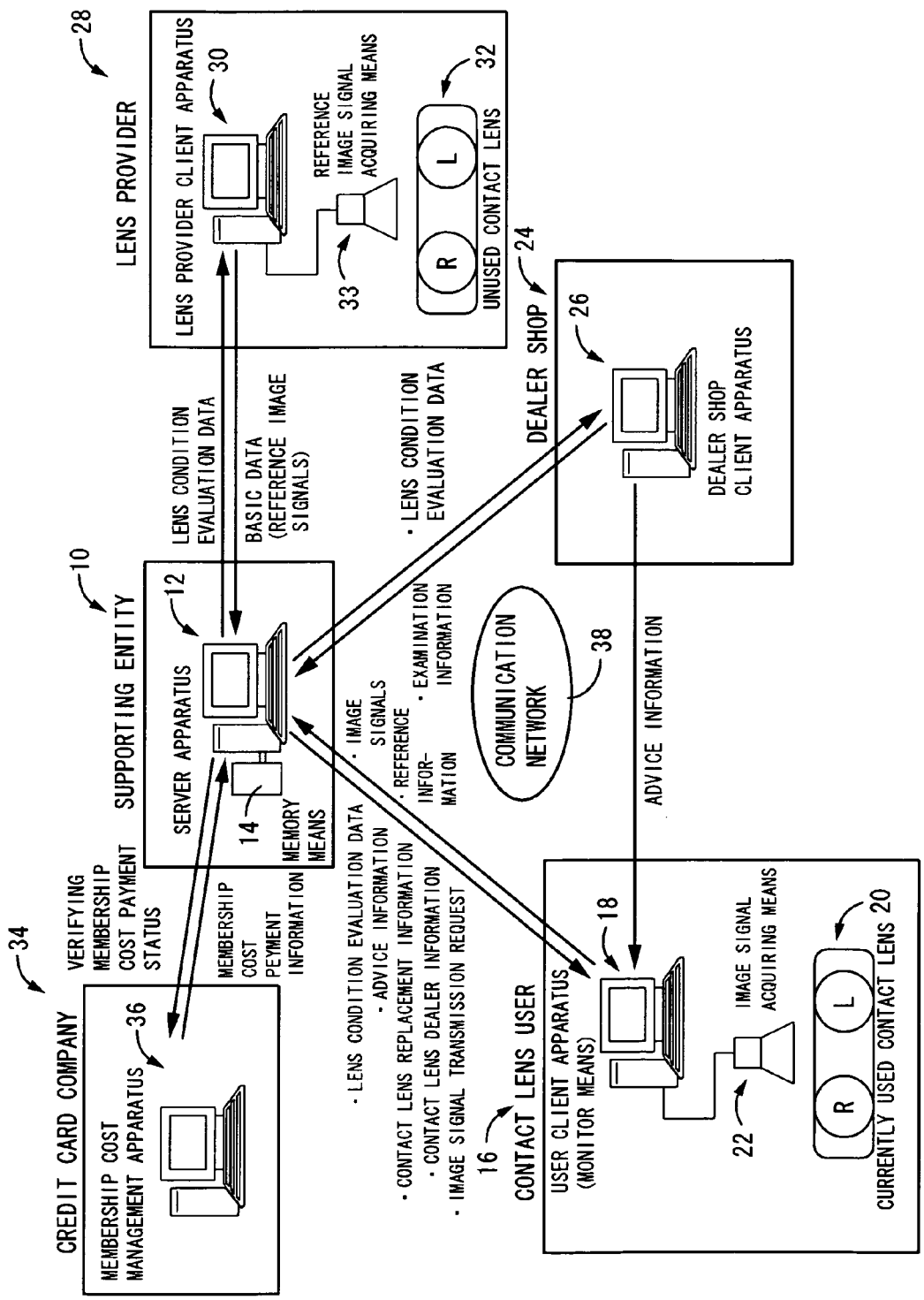
FIG. 1 is a schematic illustration showing an example of a contact lens support system according to the invention.

First, FIG. 1 is simplified overall schematic view of the arrangement of an embodiment of a contact lens support system constituted in according to the invention, and suitable for use in working the contact lens support method according to the invention. The support system of this embodiment comprises ① a server apparatus 12 administered by a supporting entity 10 that is an entity providing support, and utilized by the supporting entity 10; ② memory means 14 utilizable by the server apparatus 12; ③ a user client apparatus 18 for use by a contact lens user 16; ④ image signal acquiring means 22 administered by the user 16 for acquiring with the user client apparatus 18 an image signal of a currently used contact lens 20; ⑤ a dealer shop client apparatus 26 for use by a dealer shop 24 who directly sells contact lenses to user 16; ⑥ a lens provider client apparatus 30 for use by a lens provider 28 who designs and manufactures contact lenses, as well as providing them to the user 16 through dealer shop 24; ⑦ reference image signal acquiring means 33 administered by lens provider 28 for acquiring with the lens provider client apparatus 30 reference image signals of unused contact lenses 32; ⑧ a membership cost management apparatus 36 administered by a credit card company 34 as the membership cost management entity that manages payment status of membership costs to supporting entity 10 by users 16, for use as membership cost management means; and ⑨ a communication network 38 for use as communication network means interconnecting the server apparatus 12, user client apparatus 18, dealer shop client apparatus 26, lens provider client apparatus 30, and membership cost management apparatus 36 to enable sending and receiving of information in the form of electrical signals.

The server apparatus 12, the user client apparatus 18, the dealer shop client apparatus 26, the lens provider client apparatus 30, and the membership cost management apparatus 36 can each be composed of a PC or other computer comprising a keyboard, mouse or other input device, and a CRT as monitor means, liquid crystal display or other display device, so as to enable sending and receiving of information via the Internet or the like by way of communication network 38. In particular, the server apparatus 12 has installed thereon a WWW browser for viewing Web pages over the Internet, and at least the user client apparatus 18 and/or dealer shop client apparatus 26 have installed thereon appropriate software for viewing the Web pages over the Internet. The server apparatus 12, the user client apparatus 18, the dealer shop client apparatus 26, the lens provider client apparatus 30, and the membership cost management apparatus 36 also have installed thereon suitable software enabling individual sending and receiving of information of various kinds over the Internet using e-mail or the like and, optionally, software for encoding and decoding sent and received signals.

The supporting entity 10 (the server device 12), the lens provider 28 (the lens provider client apparatus 30), and the credit card company 34 (the membership cost management apparatus 36) each basically constitute a single unit, whereas the users 16 (the user client apparatuses 18) and the dealer shops 24 (the dealer shop client apparatuses 26) each exist in large numbers.

In particular, the user client apparatuses 18 may be constituted using personal computers, mobile terminal computers (mobile PCs), personal information terminal computers (PDAs), cell phones, PHS or other devices capable of connecting to the Internet or public communication network.

The dealer shops 24 will preferably be individuals having sufficient knowledge, experience, decision making ability and the like, and in order to facilitate utilization thereof by users 16 being provided with products, dealers will preferably be dispersed throughout an entire service area, in consideration of the residential distribution of users 16 and other factors. While the dealer shop 24 in this embodiment is shown in the drawing as being a single entity, it is possible to conceive of a dealer shop as including, for example, an on-site ophthalmologist for conducting eye exams or diagnoses. In this case, the ophthalmologist may be provided with an ophthalmologist client apparatus connected directly to communication network 38 or indirectly thereto via a dealer shop client apparatus 26, to construct an environment enabling data communication with server apparatus 12 or the like. In FIG. 1, the ophthalmologist and ophthalmologist client apparatus including the dealer shop 24 and dealer shop client apparatus 26 are portrayed in simplified terms. In the description hereinbelow, the dealer shop 24 will be described as including an ophthalmologist in order to simplify the description. In practical terms, there are some instances in which, at least in terms of appearance, the dealer shop 24 including an ophthalmologist can be viewed as integrally constituted, and as will be apparent therefrom, the dealer shop client apparatus could be either the property of the ophthalmologist, or for use by the ophthalmologist.

The support system of this embodiment includes a credit card company 34 as one element thereof. This credit card company 34 may be an existing company different from the supporting entity 10. In this case, the credit card company 34 has an individual agreement with a user 18, for example, for the user 16 to pay to the supporting entity 10 a feed for receiving support, with the credit card company 34 acquiring from the user 16 a claim for an amount of money corresponding to the fee paid. By incorporating a credit card company 34 into the system in this way, the labor required on the part of the supporting entity 10 in terms of investigating ability of the user 16 to pay, and support during periodic collection of payments, and so on can be reduced. By including in the price of contact lenses sold to users 16 the costs incurred by the supporting entity 10 in providing support to users 16, for example, it would be possible in appearance to avoid the need in the support system in the embodiments of the invention, in which case the need for a fee collection system overall including a credit card company 34 would be obviated.

The memory means 14 utilized by the server apparatus 12 may consist of a database in the narrow sense, or of any of various kinds of computer-administrable storage devices equipped with suitable memory media such as RAM, CD-R, CD-RW, DVD-R, DVD-RAM, MO, MD, PD, or HD.

Figure 2:
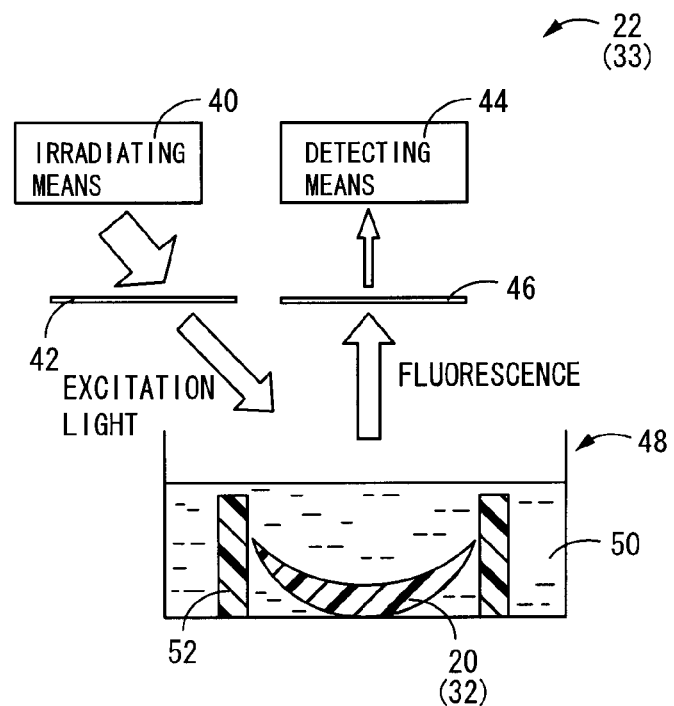
FIG. 2 is a schematic illustration showing a specific structural example of image signal acquiring means suitable for employment in the support system shown in FIG. 1.

Additionally, the image signal acquiring means 22 used by the user client apparatus 18 and the reference image signal acquiring means 33 used by the lens provider client apparatus 30 may employ basically identical structures, a specific simplified structural example of which is shown as a functional block diagram in FIG. 2.

In particular, the image signal and reference image signal acquiring means 22, 33 in this embodiment are targeted on contact lenses 20 or 32, and are designed to capture protein or lipid stain deposits thereon in the form of an image signal. In FIG. 2, 40 is an irradiating means for irradiating contact lens 20 (32) with excitation light. In particular, it is designed to have a light source able to produce light of predetermined wavelength (excitation light) that is able to excite protein or lipid lens contaminants, respectively, and cause them to fluoresce. Such a light source can be selected appropriately for use from among various lighting devices known to date, such as a xenon lamp, mercury lamp, deuterium lamp, tungsten-iodine lamp, or laser lighting device.

Typically, the fluorescence emitted upon irradiation with excitation light has intensity proportional to the intensity of the excitation light source, and thus the use of a laser, which has greater intensity than the various kinds of lamps, as the light source will give the advantage of higher sensitivity (intensity) of detected fluorescence. Of course, where laser light is employed, it will be necessary to use a level that does not produce any deterioration of the lens.

In the present invention, as regards excitation light selected depending on the type of contaminants, this is selected appropriate for the main lens contaminants being targeted for detection. As a specific example, to detect protein contaminants, it would be appropriate to use excitation light with λ (wavelength)=275-320 nm, preferably λ=275-295 nm, with fluorescence of λ=340-360 nm being advantageously selected. To detect lipid contaminants, it would be appropriate to use excitation light with λ=340-390 nm, with fluorescence of λ=430-470 nm being advantageously selected. As will be apparent from the above, proteins and lipids are typical contaminants on lenses, and since the excitation wavelengths of these differ, by irradiating a lens with excitation light of predetermined wavelength only, these contaminants can be individually and selectively detected even where deposited together in the same location. Although the fluorescence wavelength of proteins and the excitation wavelength of lipids overlap over some of their wavelength ranges, since the fluorescence produced by protein is not of sufficient intensity to produce excitation of lipids, excitation of lipids by fluorescence produced by protein will not be a problem. Also, since proteins and lipids differ from one another in the fluorescence wavelength produced by the excitation light described above, it is possible through the use of a filter for example, to utilize this difference in fluorescence wavelength for the purpose of selective detection.

In the specific wavelength ranges given above, to obtain an even sharper fluorescent image or to detect even smaller levels of contamination, it is preferable to increase the intensity of the excitation directed onto the contact lens; for example, when detecting protein contamination deposited on a contact lens, it is preferable to use 280 nm-wavelength excitation light having intensity of 0.75 $\mu W/cm^2$ or above, or when detecting lipid contamination deposited on a contact lens, it is preferable to use 340-390 nm-wavelength excitation light having intensity of 0.75 $\mu W/cm^2$ or above.

In this embodiment, in order to irradiate a lens exclusively with light of predetermined wavelength band as described above, an optical filter 42 that passes excitation light depending on the type of lens contamination is disposed between the light source of the irradiating means 40 and the contact lens 20 (32). By so doing, unwanted light of wavelengths other than the excitation light emitted by the light source can be blocked out so that the contact lens 20 (32) can be efficiently irradiated with the desired excitation light.

While selection of such an optical filter 42 will depend in part on the intensity of light emitted by the light source, where, for example, protein contamination is being detected using a 200 W mercury-xenon lamp as the light source, it would be preferable to use an optical filter having spectral transmissivity of 20% or more at λ=280 nm, so that mainly light of λ (wavelength)=275-295 nm passes through the filter to irradiate the contact lens 20 (32). By employing such an optical filter 42, the excitation light of 280 nm wavelength passing through the optical filter 42 can be given intensity of 0.75 $\mu W/cm^2$ or above. In contrast, where spectral transmissivity at 280 nm is less than 20%, since, as noted earlier, fluorescence is dependent upon the intensity of excitation light, fluorescence will be weak, posing a risk that the accuracy of detection of fluorescence, i.e. of detection of contamination, will be appreciably lower. On the other hand, when detecting lipid contamination, for reasons analogous to those above it is preferable to use an optical filter having spectral transmissivity of 20% or more at 340-390 nm.

Excitation light emitted by irradiating means 40 in this way is made to irradiate substantially the entire contact lens 20 (32), causing the lens contaminant targeted for detection to become excited by the excitation light, and enabling the fluorescent image formed by the fluorescent produced by excitation to be detected by detecting means 44. As the detecting means 44, it would be appropriate to use suitable imaging means able to sense fluorescence over the entire contact lens 20 (32) and convert this light signal into an electrical signal, to produce a lens image (fluorescent image) showing localized levels of fluorescent intensity, in other words, levels of deposited contaminants. Specifically, it would be appropriate to use a CCD camera, a combination of a stereoscopic microscope or macro lens with a CCD camera, or other known imaging means.

Additionally, in preferred practice the detecting means 44 will be one having quantum efficiency of 30% or higher in the λ (wavelength)=340-600 nm photoreception frequency band. With the detecting means 44, it becomes possible to detect fluorescence with a higher level of sensitivity, making it possible to obtain a sharper fluorescent image.

Additionally, an optical filter 46 for passing exclusively light of a certain desired wavelength is disposed between the detecting means 44 and the contact lens 20 32, whereby unwanted light, such as excitation light, having especially high intensity as compared to the fluorescence can be blocked, making it possible to detect with high selectivity only the fluorescence emitted from a predetermined contaminant which has been excited. In order to be able, for example, to detect fluorescence of a specific wavelength depending on the type of contaminant being detected, the optical filter 46 selected will preferably be an optical filter having spectral transmissivity of 50% or more at λ=340-360 nm where fluorescence from protein contaminants is being detected, or an optical filter having spectral transmissivity of 50% or more at λ=420 nm where fluorescence from lipid contaminants is being detected. In either case, where spectral transmissivity of the optical filter 46 at the aforementioned wavelengths (λ) is less than 50%, there is a risk of diminished accuracy in detection of fluorescence, i.e. detection of contamination.

By means of detecting only light that has passed through the optical filter 46 with the aforementioned detecting means 44, in the image signal and reference image signal acquiring means 22, 33 there are respectively acquired from contact lenses 20 and 32 a fluorescent image of the lens having contaminants deposited thereon (contaminated lens fluorescent image: a) by way of an image signal representing contamination by protein or lipid deposits, and a fluorescent image of an unused lens (reference lens fluorescent image: b). In the present embodiment, each of these is obtained in the form of an electrical signal.

In an exemplary structure for the image signal and reference image signal acquiring means 22, 33, the contact lens 20, 32 is immersed in a suitable measuring medium 50 (e.g. an aqueous medium) contained in a shallow bottomed, circular Petri dish 48, in which measurements are carried out. Accordingly, the Petri dish 48 is provided with a center alignment member 52 as a lens centering mechanism for maintaining the measured contact lens 20, 32 at a given placement location, whereby the contact lens 20, 32 can be easily and stably set with the lens center of the contact lens 20, 32 substantially aligned with the center axes of the irradiating means 40 and detecting means 44.

Using the user client apparatus 18, the contaminated lens fluorescent image: a acquired by user 16 using the image signal acquiring means 22 is transmitted via the communication network 38 to the server apparatus 12, where it is subjected to an analysis process by the supporting entity 10, described later. On the other hand, using the lens provider client apparatus 30 the reference lens fluorescent image: b acquired by the lens provider 28 using the reference image signal acquiring means 33 is transmitted via the communication network 38 to the server apparatus 12, where it is stored in the memory means 14.

The server apparatus 12 comprises analyzing means 54 for executing calculation processes on various kinds of data. In this analyzing means 54, on the basis of a contaminated lens fluorescent image transmitted from the user client apparatus 18, calculation processes are performed on various kinds of data, using a reference lens fluorescent image: b stored in storage device 14. The analyzing means 54 is advantageously realized through application software installed on the server apparatus 12. In this embodiment in particular, it includes subtracting means 56 for carrying out subtraction operations, and a color image-converting portion 58 for analyzing the extent of deposits on a lens into multi-tone color using mathematical operation data derived by the subtracting means 56.

Figure 3:
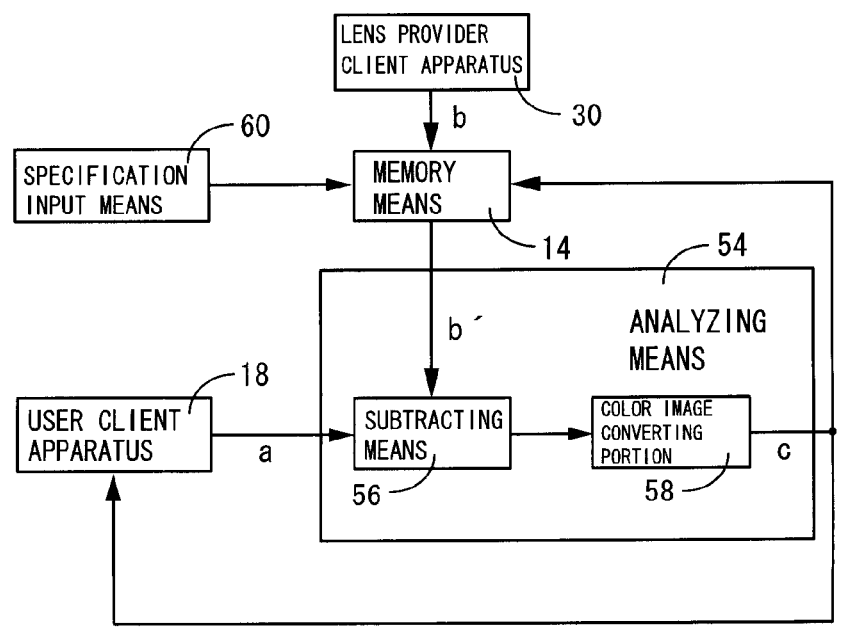
FIG. 3 is a block diagram describing image data processing means in the support system shown in FIG. 1.

That is, as shown in FIG. 3, once a contaminated lens fluorescent image: a of the contact lens 20 currently used by the user 16 has been transmitted to the analyzing means 54 of the server apparatus 12 from the user client apparatus 18 on the basis of control by the user 16, first, a reference lens fluorescent image: b of a lens having the same specifications as contact lens 20 is selected from the memory means 14, and the information for it is read out. In order to select a reference lens fluorescent image: b of a lens having identical specifications, it is possible, for example, using specification input means 60 such as the keyboard of the server apparatus 12 which controls memory means 14, to input to server apparatus 12 specification data for the contact lens 20 currently used by user 16 in order to select data for a reference lens fluorescent image: b' having identical specifications, from among reference lens fluorescent images: b of unused contact lenses 32 stored in server apparatus 12, which have been previously derived for contact lenses of all specifications provided on the market by the lens provider 28.

The data of the reference lens fluorescent image: b' of identical specifications and contaminated lens fluorescent image: a that are provided to the server apparatus 12 in this way, is input to subtracting means 56. In subtracting means 56, the reference lens fluorescent image: b of the lens prior to having contaminants deposited thereon is subtracted from the contaminated lens fluorescent image: a to give by way of a differential image the desired contaminated lens image: c. By so doing, it is possible to subtract out and eliminate signals due to measurement error resulting from fluorescence or other light causes by sources other than the measurement target.

Reference lens fluorescent images: b are derived in advance by means of a detection procedure performed by the lens provider 28 as described previously, on contact lenses (reference lenses) 32 that do not yet have contaminant deposits thereon, such as contact lenses as-manufactured or when shipped from the factory, the images being derived for lenses on a per-specification basis for specifications such as lens power: P, diameter (DIA), thickness, base curve curvature radius (BC), and the like. Preferably, production lot number will be appended as well so that lenses can be classified in more detail into given ranges, such detailed classifications being used as specification values as well.

In the manner described above, a predetermined subtraction process and color image data conversion process are carried out by the analyzing means 54 of server apparatus 12 to give a contaminated lens image: c that shows the condition of contaminant deposits on a lens, which depending on the level of contaminant deposits thereof is analyzed into multi-tone color and converted into a color image, the resultant colorized contaminated lens image: c being sent to memory means 14 where it is stored in association with an identifying signal for the user 16, as well as being transmitted to the user client apparatus 18 via the communication network 38. By so doing, a user 16 is able to view a color image of the condition of contaminant deposits on a contact lens 20 currently used by him, the image being displayed by monitor means, such as a display or printer, provided to the user client apparatus 18.

In this embodiment, in association with transmission of contaminated lens image: c from the server apparatus 12 to the user client apparatus 18, it would be possible for example to provide the user 16 with support information of various kinds depending on the extent and condition of contamination of the contact lens 20 analyzed by the server apparatus 12. Specifically, it would be possible to include in information provided to a user 16 with a message to the effect that contact lenses need to be replaced, a recommended replacement schedule, or a contact lens expiration date, as well as precautions regarding contact lens use. In the event that contact lens replacement or a more detailed eye exam is needed, with location information or contact information for a suitable dealer shop 24 at which such service can be provided. Additionally, when the user 16 transmits a contaminated lens fluorescent image: a of a currently used contact lens 20 to the server apparatus 12, it is possible to also contact the supporting entity 10 with reference information such as contact lens use conditions, observations, and the like, so that a better quality of support can be provided thereby.

In this embodiment furthermore, a contaminated lens image: c sent as lens condition evaluation data can be transmitted to the lens provider client apparatus 30 or dealer shop client apparatus 26 as well. By so doing, it is possible, for example, in the event that the lens provider 28 is also the lens designer and manufacturer, for the provider to directly receive many sets of use information from users and to utilize this information in subsequent lens design or production, or in the event that a lens morphological or other defect is discovered to quickly issue a recall of contact lenses belonging to the same lot or having the same specifications so as to prevent greater problems before they occur. At the dealer shop 24, meanwhile, before the user 16 even visits the shop, or more quickly when during a visit, the contaminated lens image: c can be utilized as information relating to contact lenses 20 worn by the user 16, whereby appropriate measures for the user 16 can be taken readily.

At the dealer shop 24, with regard not only to information pertaining to contact lenses per se, but also to the condition of the eyes of a user 16 visiting the shop and related information, such information collected through exams or reported by users or information obtained through medical examination of a user 16 can also be provided from a dealer shop client apparatus 26 to server apparatus 12 via communication network 38, with server apparatus 12 storing this exam information in memory means 14, in association with user identifying information. By compiling multiple items of such information, it becomes possible to statistically analyze correlations between information derived from a contaminated lens image: c and the conditions of the eye of a user 16 at that time, creating the possibility of realizing a higher degree of accuracy in user support.

In this embodiment furthermore, the supporting entity 10 can readily obtain information on trends, e.g. a tendency for large protein deposits, of individual users 16 on the basis of contaminated lens images: c as lens condition evaluation data, and preferably on the basis of results derived from contaminated lens images: c acquired a number of times at predetermined intervals. Thus, it is effective to use such individual information for users 16 to adjust the time interval at for requiring inspection by the user 16 by means of transmitting an image signal of contact lens 20, while using e-mail or similar means to transmit at predetermined intervals set appropriately on a user-by-user basis an instruction from the server apparatus 12 or dealer shop client apparatus 26 to the user client apparatus 18 and instruct the user to transmit an image of contact lenses 20, thereby prompting the user 16 to conduct an inspection of his contact lenses 20.

In this embodiment furthermore, on the basis of contaminated lens images: c transmitted as lens condition evaluation data from user client apparatuses 18 to server apparatus 12, amounts of protein or lipid deposits can be obtained as information relating to contamination, and on the basis of this information relating to contamination the compatibility of a particular contact lens 20 with a particular user 16 can be evaluated and the results of the evaluation transmitted to the user client apparatus 18 as information relating to recommended measures, together with the lens condition evaluation data mentioned previously.

More specifically, by using a calibration curve, described later, on the basis of contaminated lens images: c it is possible to acquire deposited protein amounts and deposited lipid amounts on a contact lens 20 in the form of numerical values. Numerical values for contaminants acquired in this way serve as indices (decision criteria) for determining compatibility of a contact lens.

On the other hand, for contact lenses of various types marketed to large numbers of users, there is acquired in advance, by way of characteristic data for each lens, data such as susceptibility to protein deposits, susceptibility to lipid deposits, ease of removal thereof, chemical resistance, and so on, this lens characteristic data being stored in lens characteristic memory means, namely, the memory means 14. Also, for lens care products of various types marketed to large numbers of users, there is acquired in advance, by way of characteristic data for each product, data regarding ability to remove proteins, ability to remove lipids, sustained effectiveness, level of effects on contact lenses, and the like, this care product characteristic data being stored in care product characteristic memory means, namely, the memory means 14.

Additionally, a decision data table indicating the advisability of use of each of the various types of contact lenses and various types of lens care products, indexed to amounts of protein deposits and amounts of lipid deposits for each, can be created based on monitored results for a large number of users carried out in advance, for example. An example of such a data table is shown in [Table 1] below.

TABLE 1

| | | L (µg) | | | |
|---|---|---|---|---|---|
| | | 0~1.5 | 1.5~3.5 | 3.5~5.0 | >5.0 |
| P (µg) | 0~2.5 | ◎ | ○ | Δ | X |
| | 2.5~6.5 | ○ | ○ | Δ | X |
| | 6.5~10 | Δ | Δ | Δ | X |
| | >10 | X | X | X | X |

In Table 1, P denotes protein deposit amount and L denotes lipid deposit amount. A ◎ symbol indicates an excellent result; a ○ symbol indicates a good result; a Δ symbol denotes a warning (caution); and an x symbol denotes incompatibility.

Where such data tables have been created, by using a data table corresponding to the type of contact lens 20 used by the user 16, values for P and L derived from a contaminated lens image: c can be employed in server apparatus 12 to quickly and easy determine compatibility. Also, where a lens or lens care product has been determined to be incompatible, it is possible, for example, to select a more compatible contact lens or lens care product by using the aforementioned contact lens characteristic data or care product characteristic data stored in memory means 14. That is, in the event of a determination of incompatibility owing to a large P or L value derived from a contaminated lens image: c, a contact lens of a type more resistant to protein or lipid deposits than the contact lens used currently, or a care product of a type having excellent ability to remove proteins and lipids, could be selected and a process to propose a switch thereto executed in server apparatus 12.

During decisions regarding contact lens compatibility such as described above, it is possible to refer also to other reference data as well. Such reference data could include, for example, subjective examination result data provided by the user 16, specifically, numerical data ranking wear comfort or dryness on a scale of 1 to 5; or objective examination result data provided, for example, by a dealer shop or ophthalmologist, specifically, numerical data ranking drying of a lens, redness of the eyes, or staining of the cornea on a scale of 1 to 5. By employing such reference data it is possible to achieve a higher degree of accuracy in decisions regarding compatibility of the contact lens 20 for the user 16.

Also, composition ratio of lachrymal fluid of the user 16 is suitably employed as reference data as well. That is, properties of lachrymal fluid are thought to correlate with ease of soiling of the contact lens 20, and thus by making reference to the composition of the lachrymal fluid of the user 16, for example, protein content and lipid content per unit of volume, as data, it is possible to verify the reliability of data for deposited amounts of protein and lipids derived from image data for the contact lens 20.

While subjective examination result data, objective examination result data, lachrymal fluid property data, and the like as described above can be acquired individually by users 16 and transmitted from user client apparatus 18 to the server apparatus 12 via the communication network 38, since objective examination result data and lachrymal fluid property data require specialized equipment and knowledge in handling, in preferred practice users 16 will be prompted to visit their dealer shop 24 (including those with an on-site ophthalmologist) where the data will be acquired, and the data so acquired transmitted from the dealer shop client apparatus 26 to the server apparatus 12 via the comunication network 38.

Also, in preferred practice, results, decision data regarding compatibility of contact lenses, and so on will be associated with a particular user 16 and stored in the memory means 14 of the server apparatus 12.

Since data of various kinds collected and stored in memory means 14 includes individual information about users 16, it is effective to use a security feature when the dealer shop 24 or user 16 views the data; for example, in preferred practice, permission to view data will be granted on the condition of, for example, a match with pre-registered identifying information, or viewable information will be limited depending on the accessing individual.

Figure 4:
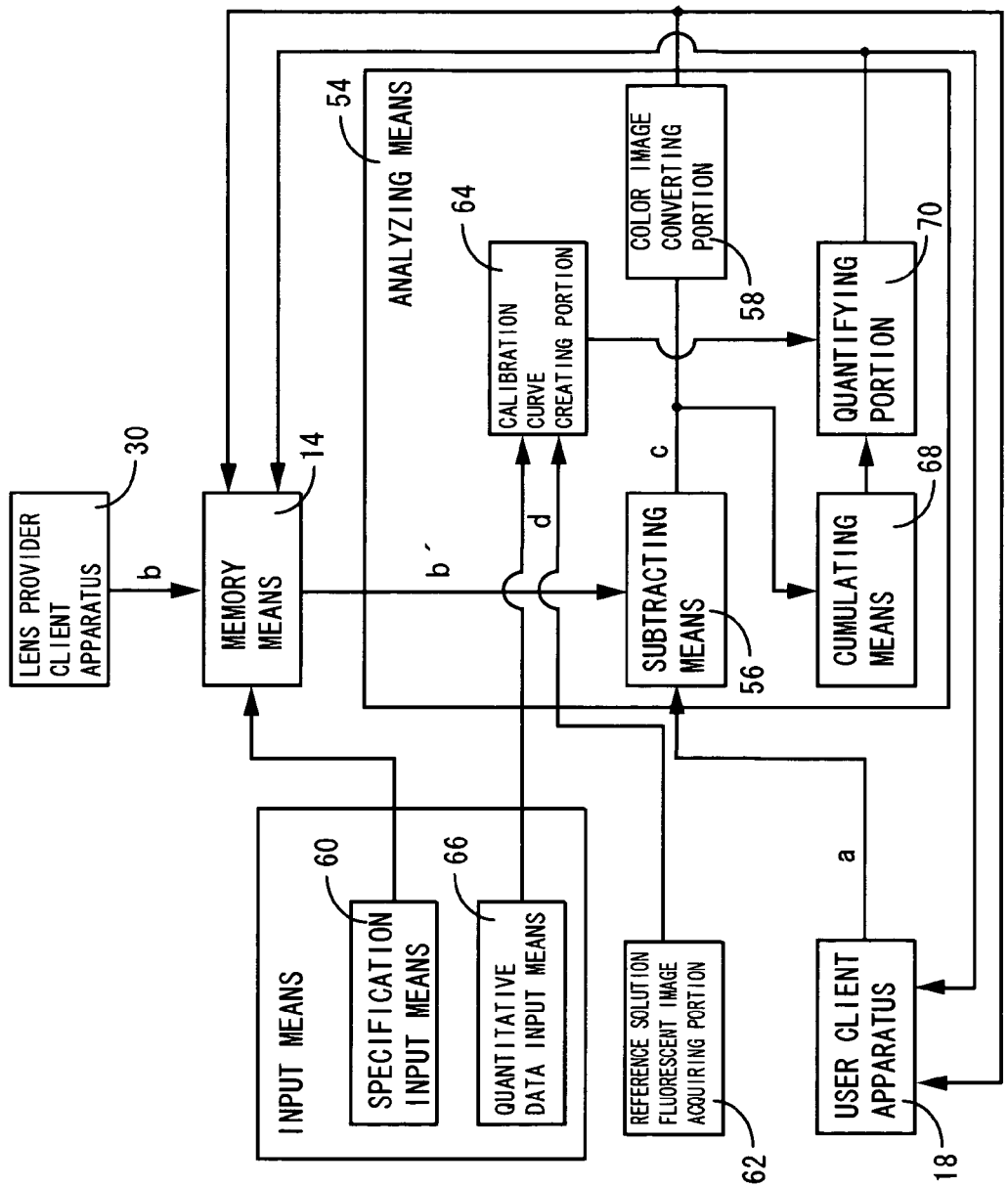
FIG. 4 is a block diagram describing another example of image data processing means employed in the support system shown in FIG. 1.

The arrangement of the apparatus for detecting contamination or other defects employed in the contact lens support system according to the invention is in no way limited to those described by way of example hereinabove. A structure like that depicted in FIG. 4 for example, that carries out quantification of deposited contamination using a calibration curve, could be employed advantageously as well. In FIG. 4, parts and sites of similar construction to those in the embodiments hereinabove are assigned the same symbols used in the preceding embodiments, and are not described in any detail.

The support system shown in FIG. 4 comprises a reference solution fluorescent image acquiring portion 62. In this reference solution fluorescent image acquiring portion 62, using an apparatus similar in structure to the contact lens 20, 32 fluorescent image acquiring means shown in FIG. 2 previously, a detection procedure similar to that for the aforementioned contact lenses is carried out on a reference solution of known concentration (dissolved quantity) and known quantity (volume) placed in a Petri dish or other receptacle, in order to detect a fluorescent image of the predetermined solution. The reference solution fluorescent image acquiring portion 62 may be provided to the supporting entity 10, but may instead by provided to the lens provider 28. In preferred practice, data acquired in advance will be stored in memory means 14.

The reference solution fluorescent image: d so obtained is sent to analyzing means 54 of server apparatus 12, and in a calibration curve creating portion 64 is subjected to predetermined mathematical operation processes to create a calibration curve: $y=f(x)$ which plots dissolved quantity of a reference substance (y-axis parameter) dissolved in a reference solution against fluorescence (x-axis parameter).

More specifically, the fluorescent image: d received by calibration curve creating portion 64 is formed by detecting fluorescence in pixel units, in other words, in extremely small area units. The intensity of fluorescence per single pixel exhibits the same value over the entire detected area (that is, a number of pixels corresponding to the area of the mouth of the receptacle in which the reference solution has been placed) of the reference solution. Fluorescent intensity per pixel of the reference solution will of course vary with the dissolved quantity of the reference substance and the amount (volume) of solution, and will also vary with the area of the mouth of the receptacle in which the reference solution has been placed, for example, for a given amount of reference substance dissolved in a given amount of solvent, halving the area of the mouth results in doubling of the fluorescent intensity per pixel. Accordingly, in the calibration curve creating portion 64 of this embodiment, since contact lenses differ in diameter (detected area) depending on their specifications, in order to be able to quantify the amount of deposited contaminants on any contact lens, as one of the parameters for the calibration curve, there is employed a quantity of fluorescence (x: fluorescent intensity×detected area) which is a value derived by multiplying intensity per pixel of the fluorescent image: d of the reference solution is by the detected area thereof. Quantity of fluorescence (x) of reference solutions containing various dissolved quantities calculated in the above manner is then plotted against the dissolved quantity (y) proportional thereto to create the desired calibration curve. In order for quantity of fluorescence (x) to be proportional to solution amount (volume) as well, in preferred practice the amount (volume) of reference solution must always be constant for the contaminant component, and the area of the mouth of the receptacle containing the reference solution will be of a size detectable by the fluorescent image detecting means.

Reference solution data required for the above mathematical operations in calibration curve creating portion 64, for example, detected area and dissolved amount of reference substance, can be input by means of suitable quantitative data input means 66 such as keyboard, as illustrated in FIG. 4. The aforementioned reference solution may be prepared by uniformly dissolving a predetermined amount of an artificial contaminant (reference substance) in a predetermined solvent; for example, to quantify protein contamination, a solution of a predetermined amount of albumin dissolved in purified water could be used, or quantify lipid contamination, a solution of a predetermined amount of olive oil dissolved in ethanol could be used, respectively.

The calibration curve created in advance in the above manner is employed during quantification of amounts of contaminants deposited on contact lenses, by contrasting with the calibration curve a cumulative value arrived at by cumulating fluorescent intensity per pixel unit derived from a contaminated lens image: c, in order to quantify the amount of contaminants deposited on a predetermined area, to ascertain the resultant value.

Specifically, the contaminated lens image: c obtained in subtracting means 56 is sent to color image converting means 58 on the one hand, while also being transmitted to cumulating means 68, where a cumulating process is carried out by the cumulating means 68; the cumulating process could be carried out, for example, during quantification of the amount of a contaminant deposited over the entire face of a contact lens, by adding up fluorescent intensity of pixel (small area) units for pixels corresponding in number to the area of the contact lens. The method for carrying out the cumulating process is not limited to the above method, it being possible instead to perform partial quantification of contaminants deposited on a contact lens, for example.

In quantifying portion 70, the cumulative value derived in the above manner is contrasted with a calibration curve [y=f(x)] created by the calibration curve creating portion 64 in order to carry out quantification of contamination. That is, the cumulative value is substituted for quantity of fluorescence (x) in the calibration curve [y=f(x)], dissolved quantity (y) is calculated, and this dissolved quantity (y) is designated as the deposited amount of contaminant deposited in a range of interest on the contact lens, and is output to the user client apparatus 18 or the like.

While the invention has been described in detail hereinabove through certain preferred embodiments, these are merely exemplary and the invention should not be construed as being limited in any way to the specific disclosure of the embodiments herein; various alterations, modification and improvements to the invention will be apparent to the practitioner of the art, and these shall of course be included within the scope of the invention insofar as they do not depart from the spirit thereof.

For instance, in the embodiments hereinabove, detection of contaminants such as proteins or lipids deposited on contact lenses used by users was described, but the invention would be applicable in an analogous manner for detecting other sorts of defects relating to lens morphology, such as deformation or chipping, or to lens damage such as scratches or chips. The method of imaging by means of fluorescence using excitation light as in the embodiments hereinabove may be selected appropriately with regard to wavelength of excitation light or that during detection of fluorescence, and thereby employed advantageously for lens damage or the like as well.

Accuracy relating to acquired image signals or to image signals ultimately displayed on a user client apparatus is set appropriately depending on the required detection accuracy, the target, and other considerations. For example, the amount of data handled can be reduced by having the image ultimately displayed on a user client apparatus be a black and white image.

It is also possible for the lens provider to be the supporting entity, in which case an arrangement wherein the lens provider client apparatus is used concomitantly as the server apparatus would be possible.

Reference lens fluorescent images need not necessarily be produced through actual measurements; theoretically, the fluorescent image appearing with a new lens could be analyzed, and this utilized as a reference image signal.

Additionally, as the image signal acquired by the image signal acquiring means, it would be possible to use a captured image produced by ordinary visible light rather than a fluorescent image taught by way of example herein; this would enable detection of lens morphological defects, chipping or other such defects.

By employing as the image signal acquiring means a digital video camera able to capture motion video (including "virtual" motion video created from a series of still images) in an arrangement similar to that in the embodiments hereinabove, it becomes possible to employ motion video, in place of still images or together with still images, as image signals, and through analysis and evaluation on the server apparatus of image signals containing such motion video, to acquire lens condition evaluation data of a sort difficult to acquire from still images alone. As a specific example, on the basis of an image signal of the user's eyeball with the contact lens in place shot from the front in motion video over a predetermined time interval, it would be possible to capture movement of the contact lens during blinking (distance moved, time until resuming a stable condition, etc.) by way of contact lens conditions for evaluation, and to thereby estimate or examine the compatibility of the contact lens, extent of contamination, lachrymal fluid condition, or the like.

As will be apparent from the description hereinabove, by means of the contact lens user support system or support method structured in accordance with the present invention, it is possible for contact lens users to readily ascertain contamination o and other conditions of their contact lenses by means of a simply apparatus, and on the basis of the evaluation data obtained thereby to take appropriate measures to make possible comfortable contact lens wear, while enabling a supporting entity to provide users with ongoing support, as well as to efficiently use data of various kinds acquired while contact lenses are worn, to as to be able to provide further improved user support.

INDUSTRIAL APPLICABILITY

As will be apparent from the description hereinabove, the present invention pertains to sales by supplying contact lenses to users in the industrial field relating to manufacture and sales of contact lenses, and to after-sale support thereof, from which it will be apparent that the invention is capable of being worked by way of industrial activity.

The invention claimed is:

1. A contact lens user support system comprising:
a multiplicity of user client apparatuses for use by a multiplicity of users who use contact lenses, each apparatus including image signal acquiring means for acquiring an image signal of a contact lens used by each user;
a server apparatus for use by a supporting entity, the apparatus including evaluation data calculating means for deriving lens condition evaluation data for evaluating the condition of the contact lens on the basis of the contact lens image signal;
memory means for storing information able to be read out by the server apparatus; and
communication network means enabling sending and receiving of signals between the user client apparatuses and the server apparatus,
wherein the image signal acquired by the image signal acquiring means of the user client apparatus with the contact lens used by the user as a subject is transmitted via the communication network means to the server apparatus;
the lens condition evaluation data for the contact lens is derived by the evaluation data calculating means of the server apparatus, the lens condition evaluation data being associated with identifying information of the user and stored in the memory means; and the lens condition evaluation data is transmitted via the communication network means to the user client apparatus so as to be provided to the user.

2. A contact lens user support system according to claim 1, wherein the image signal includes a motion video image signal.

3. A contact lens user support system according to claim 1, wherein the lens condition evaluation data derived by the evaluation data calculating means of the server apparatus includes at least one set of data relating to the contact lens used by the user and selected from evaluation data relating to contaminants such as protein deposits or lipid deposits; evaluation data relating to morphology such as deformation or chipping; and evaluation data relating to damage such as scratches or cracks.

4. A contact lens user support system according to claim 1, wherein the image signal acquiring means of the user client apparatus includes: irradiating means for irradiating the contact lens used by the user with excitation light able to excite a predetermined target substance to produce fluorescence; and detecting means for detecting a lens fluorescent image formed by fluorescence produced principally by the predetermined target substance in the contact lens when illuminated with excitation light by the irradiating means.

5. A contact lens user support system according to claim 4, wherein the detecting means in the user client apparatus is composed of imaging means able to image the contact lens illuminated with excitation light by the irradiating means, and to detect it as an image signal in which levels of fluorescent intensity corresponding to the condition of the target substance are associated with locations on the contact lens.

6. A contact lens user support system according to claim 5, wherein the evaluation data calculating means in the server apparatus is constituted to include cumulating means for cumulating fluorescent intensity in pixel units derived on the basis of the image signal of the contact lens acquired by the imaging means of the user client apparatus.

7. A contact lens user support system according to claim 6, wherein the predetermined substance excited by means of the excitation light is a contaminant deposit such as a protein or lipid deposited on the contact lens, and the server apparatus is constituted to include: (i) calibration curve creating means for creating a calibration curve indicating a relationship between a product of fluorescent intensity of a standard solution of known concentration having dissolved therein a component of interest in the contaminant deposit on the contact lens and the detected area thereof, to a dissolved amount of component of interest of the contaminant deposit in the standard solution; and (ii) quantifying means for comparing a cumulative value derived by the cumulating means with a calibration curve derived by the calibration curve creating means to carry out quantification of the contaminant deposit on the contact lens.

8. A contact lens user support system according to claim 5, wherein the evaluation data calculating means in the server apparatus, on the basis of the image signal of the contact lens acquired by the imaging means of the user client apparatus, analyzes the fluorescence of the contact lens into multi-tone color to derive the lens condition evaluation data, and the user client apparatus is provided with monitor means for displaying the fluorescence of the contact lens in multi-tone color, on the basis of the lens condition evaluation data transmitted thereto through the communication network means.

9. A contact lens user support systems according to claim 1, further comprising reference signal memory means adapted to store therein data of a multiplicity of reference image signals acquired in advance for unused contact lenses respectively having same specifications as various types of the contact lenses used by the multiplicity of the users, wherein the evaluation data calculating means of the server apparatus processes by calculation the image signal of the contact lens used by the user while referencing to the reference image signal provided by the reference signal memory means in order to obtain the lens condition evaluation data for the lens.

10. A contact lens user support system according to claim 9, wherein for the various types of the contact lenses used by the multiplicity of the users, reference is made to reference image signals for corresponding unused contact lenses having identical specifications therewith, which reference includes a lot number.

11. A contact lens user support system according to claim 1, further comprising membership cost management means adapted to store therein membership cost payment information made by the users to the supporting entity, wherein the server apparatus verifies membership cost payment status of the user on the basis of the membership cost payment information stored in the membership cost management means, and the lens condition evaluation data is transmitted to the user client apparatus on the condition of the user having paid the membership cost to the supporting entity.

12. A contact lens user support system according to claim 1, further comprising in the server apparatus image signal requesting means that, once the server apparatus has received the image signal from the user client apparatus via the communication network means, counts for a predetermined set time period, and when the set time period has elapsed request the user client apparatus via the communication network means to transmit a new image signal.

13. A contact lens user support system according to claim 1, further comprising a lens provider client apparatus for use by a lens providing entity that manufactures the contact lenses, wherein sending and receiving of signals between the lens provider client apparatus and the server apparatus is possible by means of the communication network means, and wherein the lens condition evaluation data is transmitted from the server apparatus to the lens provider client apparatus, and basic data provided for contact lenses manufactured by the lens providing entity is transmitted from the lens provider client apparatus to the server apparatus.

14. A contact lens user support system according to claim 13, wherein the lens provider client apparatus comprises reference image signal acquiring means for acquiring a multiplicity of reference image signals acquired in advance for unused contact lenses respectively having same specifications as various types of the contact lenses used by the multiplicity of the users, and stored in reference signal memory means the reference image signal being transmitted to the server apparatus by way of at least one item of the basic data.

15. A contact lens user support system according to claim 1, further comprising: a lens dealer shop client apparatus for use by a lens dealer shop that sells the contact lenses directly to the users, wherein sending and receiving of signals between the lens dealer shop client apparatus and the server apparatus is possible by means of the communication network means, and the lens condition evaluation data is transmittable from the server apparatus to the lens dealer shop client apparatus; and comprising visit instructing means that refers to the lens condition evaluation data, and if necessary transmits from the server apparatus to the user client apparatus a dealer shop visit instruction signal that instructs the user to visit the lens dealer shop.

16. A contact lens user support system according to claim 15, wherein examination information relating to results of examination of the user who has visited the lens dealer shop is transmitted from the lens dealer shop client apparatus to the server apparatus, the information being associated with identifying information for the user and stored in the memory means.

17. A contact lens user support system according to claim 1, further comprising lens characteristic memory means for storing characteristic data for each type of the contact lens used by the users and/or care product characteristic memory means for storing characteristic data for care products of various types used with contact lenses used by the users, wherein in the server apparatus, information relating to protein deposits, lipid contaminants, or other contamination of the contact lens used by the user is acquired on the basis of the image signal acquired from the user client apparatus, and in the evaluation data calculating means, characteristic data stored in the lens characteristic memory means and/or care product characteristic memory means is utilized to derive from the information relating to recommended measures to be taken in regard to contamination of the contact lens, the information relating to recommended measures being included in the lens condition evaluation data, and the lens condition evaluation data being transmitted to the user client apparatus.

18. A contact lens user support system according to claim 17, further comprising lachrymal fluid data memory means for storing lachrymal fluid data relating to the properties of the lachrymal fluid of the user, wherein in the evaluation data calculating means, recommended measures in relation to the contact lens are derived from information relating to the contamination utilizing characteristic data stored in the lens characteristic memory means and/or the care product characteristic memory means, while making reference to individual the lachrymal fluid data for the user stored in the lachrymal fluid data memory means.

19. A contact lens user support system according to claim 1, wherein in the server apparatus information relating to protein deposits, lipid contaminants, or other contamination of the contact lens used by the user is acquired on the basis of the image signal acquired from the user client apparatus, lens characteristic memory means are provided for storing characteristic data regarding various kinds of the contact lenses used by the users, wherein the evaluation data calculating means, contact lens characteristic data stored in the lens characteristic memory means is utilized in deriving evaluation data of compatibility of the contact lens of the user from the information relating to contamination, with the resultant lens compatibility evaluation data being included in the lens condition evaluation data as information relating to the recommended measures, and the lens condition evaluation data transmitted to the user client apparatus.

20. A contact lens user support system according to claim 1, wherein in the server apparatus information relating to protein deposits, lipid contaminants, or other contamination of the contact lens used by the user is acquired on the basis of the image signal acquired from the user client apparatus, while care product characteristic memory means are provided for storing characteristic data regarding various kinds of lens care products for use with the contact lenses used by the users, and wherein in the evaluation data calculating means, lens care product characteristic data stored in the care product characteristic memory means is utilized in deriving evaluation data of compatibility of the lens care product of the user from the information relating to contamination, with the resultant compatibility care product evaluation data being included in the lens condition evaluation data as information relating to the recommended measures, and the lens condition evaluation data transmitted to the user client apparatus.

21. A contact lens user support system according to claim 19, wherein at a point in time coming at the end of a predetermined trial period commencing with initial use of new contact lenses by the user, and/or in the event that use of contact lenses by the user is ongoing a point in time coming after a predetermined time interval has elapsed, evaluation data of compatibility of the contact lenses or the lens care product is derived.

22. A contact lens user support method characterized in that an image signal of a contact lens acquired by a user of the contact lens himself is transmitted through communication network means from a user client apparatus provided for use by the user to a server apparatus provided for use by a supporting entity; at the supporting entity, lens condition evaluation data for evaluating a condition of the contact lens is derived on the basis of the contact lens image signal; the lens condition evaluation data is associated with individual information for the user and stored in memory means utilizable by the server apparatus; and the lens condition evaluation data is provided to the user by being transmitted to the user client apparatus through the communication network means.

23. A contact lens user support method according to claim 22, wherein the contact lens image signal includes a motion video image signal.

24. A contact lens user support method according to claim 22, wherein the lens condition evaluation data provided to the user by being transmitted from the server apparatus to the user client apparatus includes evaluation data relating to protein deposits, lipid deposits, or other such contaminants, and/or evaluation data relating to morphology such as deformation or chipping, and/or evaluation data relating to damage such as scratches or cracks in the contact lenses used by the user; and wherein information relating to the need to replace the contact lenses and information relating to a lens dealer shop serving as provider for the contact lens replacement, user examination and the like are provided to the use together with the lens condition evaluation data, by being sent to the user client apparatus.

25. A contact lens user support method according to claim 22, wherein when the contact lens image signal is transmitted from the user client apparatus to the server apparatus, reference information relating to lens wear conditions by the user and the like is included in the transmission.

26. A contact lens user support method according to claim 22, wherein multiple items of advice information relating to contact lens handling and wear are prepared in advance, and one of the items is selected with reference to the lens condition evaluation data provided to the user and provided to the user together with the lens condition evaluation data.

27. A contact lens user support method according to claim 22, wherein examination information relating to examination results for a user acquired at a lens dealer shop directly selling the contact lenses to the user is transmitted from a lens dealer shop client apparatus used by the lens dealer shop to the server apparatus, and is associated with individual information for the user and stored in the memory means utilizable by the server apparatus.

28. A contact lens user support method according to claim 22, wherein information stored in association with individual information for the user in the memory means is utilizable from outside the server apparatus through the communication network means, on the condition of verification of a match with pre-registered identifying information or the like.

29. A contact lens user support method according to claims 22, wherein in the supporting entity, information relating to protein deposits, lipid contaminants, or other contamination of the contact lens used by the user is acquired on the basis of an image signal of the contact lens; utilizing lens characteristic data for various types of contact lenses and/or care product characteristic data relating to lens care products of various types for use with the contact lenses, recommended measures to be taken with regard to the contact lens are derived from information relating to contamination of the contact lens; and information relating to the recommended measures is included in the lens condition evaluation data and provided to the user.

30. A contact lens user support method according to claim 29, wherein information relating to the properties of the lachrymal fluid of a user is acquired, and while making reference to the lachrymal fluid data, the lens characteristic data and/or the care product characteristic data is utilized to derive from the information relating to contamination recommended measures to be taken with regard to the contact lens.

31. A contact lens user support method according to claim 29, wherein wherein at a point in time coming at the end of a predetermined trial period commencing with initial use of new contact lenses by the user, and/or in the event that use of contact lenses by the user is ongoing a point in time coming after a predetermined time interval has elapsed, the recommended measures to be taken with regard to the contact lens are derived.

* * * * *